Figure 1:
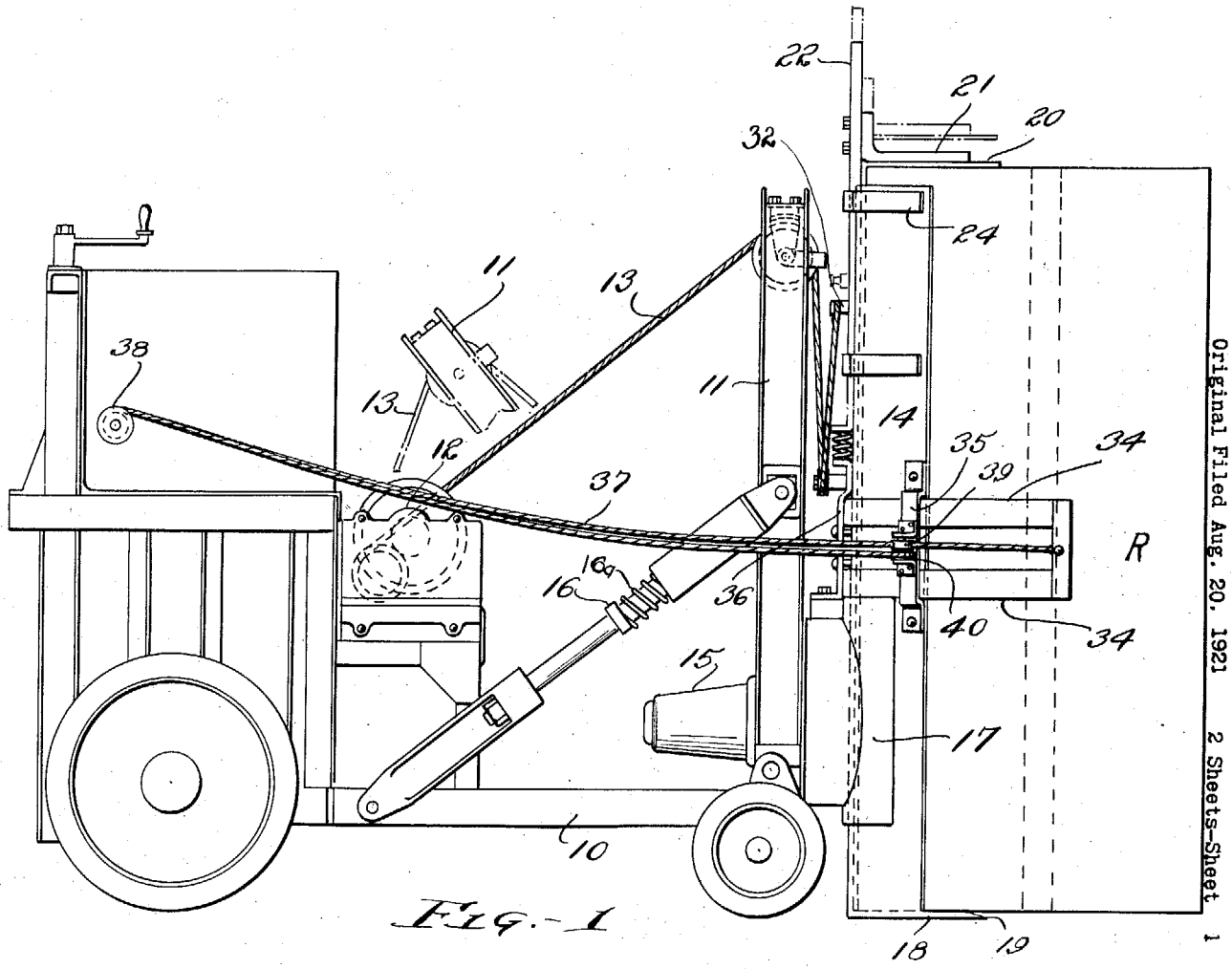

July 17, 1928.

Re. 17,043

A. R. GOLDRICK

INDUSTRIAL TRUCK

Original Filed Aug. 20, 1921 2 Sheets-Sheet 1

INVENTOR
Albert R. Goldrick
By Baker & Macklin,
ATTORNEYS

July 17, 1928. Re. 17,043
A. R. GOLDRICK
INDUSTRIAL TRUCK
Original Filed Aug. 20, 1921 2 Sheets-Sheet 2
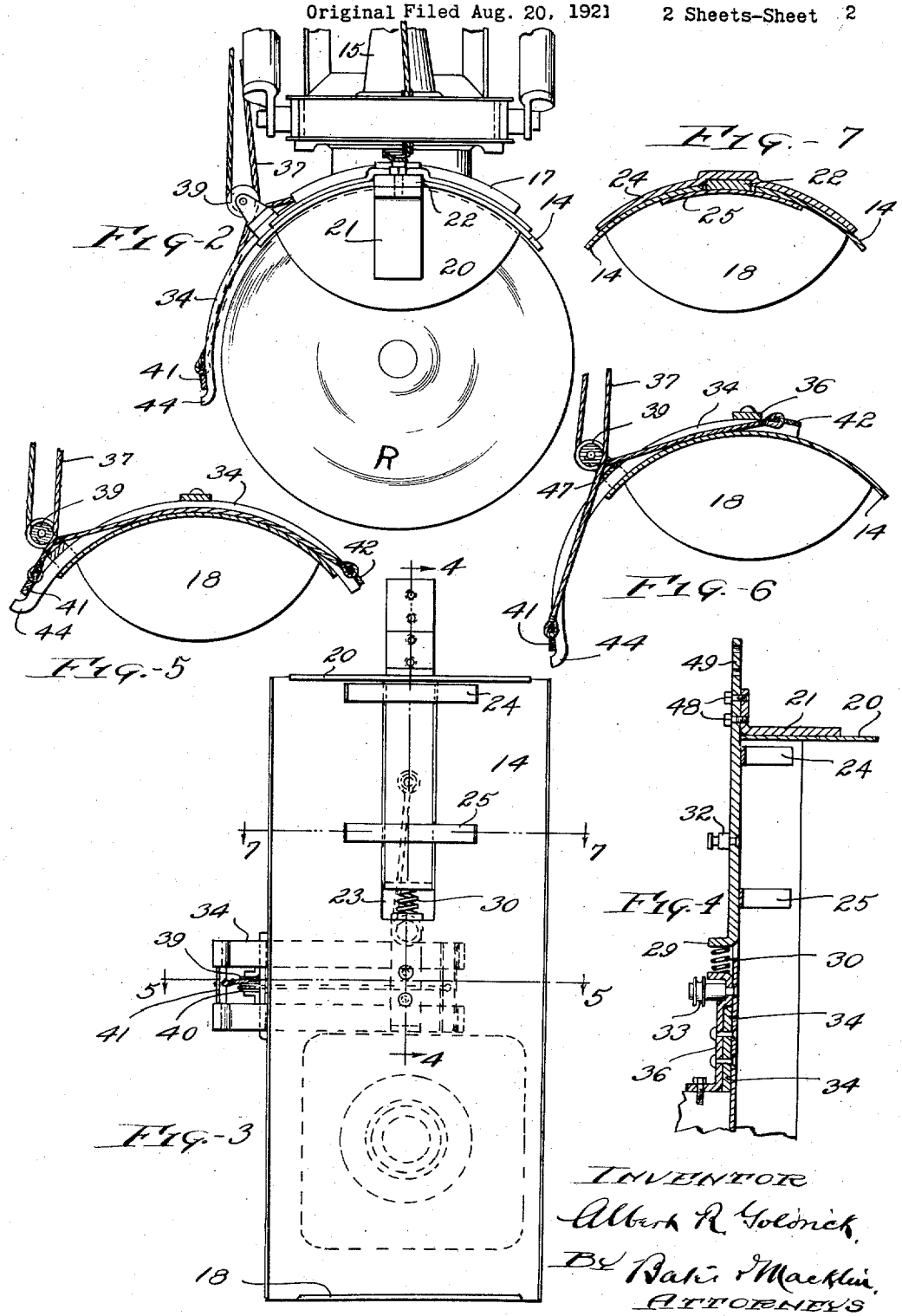
INVENTOR
Albert R. Goldrick
By Baker & Macklin
ATTORNEYS Reissued July 17, 1928. Re. 17,043

UNITED STATES PATENT OFFICE.

ALBERT R. GOLDRICK, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

Original No. 1,439,233, dated December 19, 1922, Serial No. 493,799, filed August 20, 1921. Application for reissue filed December 20, 1923. Serial No. 681,889.

The general object of the present invention is the provision of a load engaging mechanism, on an industrial truck adaptable for the loading, unloading and transporting of loads, which will automatically secure the load against displacement when the latter is being engaged or transported by the truck.

A further object of my invention is the provision of a load carrying mechanism on an industrial truck which may be moved, relative to the body of the truck to raise the load, by a load carrier actuating mechanism acting upon the carrier indirectly through a load securing means, which, when actuated secures the load in position upon the carrier before the carrier is moved relative to the truck.

A still further object of my invention is to so arrange the foregoing combination of mechanisms upon an industrial truck that the operator may maneuver the truck to approach a load while remaining in position thereon and to cause the truck to engage and lock the load before initiating a transportable movement of the load.

Other objects will become apparent from the following description which refers to the accompanying drawings illustrating an adaptation thereof to an industrial truck equipped to handle large or heavy paper rolls. The essential characteristics are summarized in the claims.

In the drawings Fig. 1 is a side elevation of a truck such as I have referred to; Fig. 2 is a plan view of a load engaging mechanism positioned on one end of the truck; Fig. 3 is a front elevation of a load engaging and securing means; Fig. 4 is a cross-sectional elevation taken substantially along the lines 4—4 of Fig. 3; Fig. 5 is a transverse section taken through the load engaging means substantially on the line 5—5 of Fig. 3; Fig. 6 is a view similar to Fig. 5 but showing the load engaging parts in a different position, and Fig. 7 is a section taken along the line 7—7 of Fig. 3.

Self-propelled vehicles have been adapted to a great variety of industrial uses in and about manufacturing plants, commercial warehouses, railroad termini, etc., and are commonly referred to as industrial trucks. The nature of my invention is such as to be readily adaptable to a variety of forms of such trucks. An adaptation thereof, as applied to a truck designed specifically for the purpose of handling and transporting large paper rolls, and the like, is shown in the drawings for convenience of illustration only. It is to be understood that the invention may be adapted to any type of industrial truck which is provided with mechanism for elevating a load upon a load supporting medium.

In the type of truck illustrated in the drawings, it is important, that in order to use the truck efficiently in handling paper rolls, the rolls must be engaged by the truck in such manner that a sufficient clearance space may be present about the circumference of the rolls whereby large rolls may be positioned in juxtaposition in warehouses, railway cars, etc., without necessitating any physical effort on the part of the operator excepting that required to manipulate the control mechanism of the truck. The use of my invention greatly facilitates the construction of a truck which will fulfill these required characteristics.

In the drawings in Fig. 1, I show such a truck which may have a body or frame 10 and an upright frame 11 preferably pivotally mounted at one end of the frame or body 10. In this particular type of truck the load engaging means may comprise a load supporting member 14 conforming in general shape to the approximate dimensions of the rolls to be handled. This load supporting member may be pivotally mounted on the upright frame 11. The pivotal connection between the upright frame 11 and load supporting member 14 is located in such manner that when the frame 11 is swung inwardly over the truck the load supporting member may be swung either into a substantially upright position or to a substantially horizontal position while supporting the load.

The means for effecting the swinging movements of the load supporting member 14 and the upright member 11 may comprise a power operated winding mechanism conventionally shown at 12 and a flexible member 13. The end of the flexible member may be secured to the load supporting member 14 a sufficient distance from its pivotal connection to the upright frame 11 whereby when the winding mechanism acts upon the flexible member a turning movement of the load supporting member 14 may be effected relative to its supporting medium. Hence the load may be received in a horizontal position. This connection may be so located, however, that the reactive forces upon the members 11 and 14 will be such that the upright frame 11 may be tilted inwardly before the load supporting member is caused to swing upon its pivotal mounting, thus causing the member 14 to clear the ground or floor when being swung. The innermost position of the upright frame 11 is indicated by the dot and dash lines in Fig. 1. Suitable cushioning means, such as telescopic members 16 and spring members 16[a], may serve to limit the inward and outward swing of the frame member 11. The spring members 16[a] also serve to position the frame 11 vertically when the winding mechanism is released.

A truck having the general characteristics herein described is fully set forth in the application for Letters Patent of Clyde E. Cochran on an "industrial truck" filed January 9th, 1920, Serial No. 394,933, whose assignee is The Elwell-Parker Company of Cleveland, Ohio, the latter being the assignee of the present applicant. In the drawings of the present application, however, the circumferential span of the load supporting member 14 is shown as being greatly decreased relative to the span of the corresponding member illustrated in the Cochran application referred to, whereby the truck may be very readily manipulated, when carrying rolls into such position that the rolls may be stored or deposited in upended position and juxtaposed to one another. The span of the load supporting member herein illustrated is of sufficient width, however, to permit proper supporting and securing of the rolls while affording rigid connection to a pivot member 17 which is associated with the pivotal bearing mechanism 15 carried by the upright frame 11. This decrease in the dimensions of the load supporting member 14 is made possible by the adaptation of my invention to the particular problem here encountered, namely the obtaining of sufficient strength in the load engaging member to support heavy loads and proper clearances whereby the loads may be deposited in the manner described to save floor space.

An adaptation of my invention to a paper handling truck will now be described:

My invention contemplates the use of a load securing or clamping means and a load elevating and supporting means which are actuated in sequence by a power operated means, the force to elevate the load, being first exerted upon the load clamping means and while being maintained thereon to the load supporting means whereby a load elevating movement of the latter is effected. Accordingly, as shown in Fig. 1, the load supporting member 14 may be provided with a bottom projecting portion 18, which is adapted to lie in a horizontal position on the ground or floor when the load supporting member 14 is in a substantially upended or a load receiving and depositing position. In this particular instance the projecting portion may have a tapered edge 19 to facilitate the forcing thereof under the load or paper roll by a backward movement of the truck.

In the present form of my invention the load clamping means may comprise a load gripping member 20 preferably flat and having a general shape corresponding to the shape of the projecting portion 18. The member 20 may be mounted upon a mechanism which may be actuated by the flexible member 13. This mechanism may comprise an angle member 21 supporting the gripping member 20 and adjustably secured to a member 22 slidably mounted upon the upper portion of the load carrying member 14, as shown in detail in Figs. 2 to 6 inclusive. The slide member 22 may be retained in an elongated opening 23 formed in the load carrying member 14 by reenforcing bars 24 and 25 rigidly secured to the latter. The end of the cable 13 may be secured to a stud 32 rigidly attached to the slide member. In order that the cable may impart a downward movement to the slide member it may be extended over a sheave member 33 positioned on the load receiving member 14 below the slot 23. The proper positioning of the sheave member 33 is likewise dependent upon the amount of torque which would be required to rotate a maximum load carried by the member 14 about its pivotal axis or bearing 15, the latter action taking place of course if the load is being received horizontally and after the member 20 has been brought into engagement with the load or roll R.

The slide member 22 may have the lower end thereof turned out to form a seat 29 affording an abutment for a resilient member 30. The resilient member 30 thus serves to maintain the slide bar 22 and gripping member 20 in a sufficiently elevated position, as illustrated by the dot and dash lines in Fig. 1, to provide adequate space or clearance between the gripping member 20 and the top of the roll when the truck is being maneuvered into an approach to the load. The spring 30 likewise serves to cause the clamping member 20 to be elevated out of engagement with the load when the cable is slackened consequent to the load supporting member bearing upon the ground or floor.

Any convenient means may be provided to afford adjustability between the slide member 22 and the angle bar 21 which supports the gripping member 20. As shown in Fig. 4 the removable bolts 48 are shown as extending through two of a series of openings 49 formed in the upper end of the slide member 22, thus affording adjustment of the gripping member 20 for rolls of any length and within the weight capacity of the truck.

It will be seen that the lowering or load engaging movement of the slide member 22 and gripping member 20 is automatic and dependent upon the operation of the upright frame 11 and load supporting member 14 by the cable, and that this automatic action is incident to the elevating movement of the load by operation of the winding mechanism 12. It will be also apparent that the gripping or clamping action of the member 20 may be directly proportional to the weight of the load being handled. Furthermore it will be seen that as the winding mechanism 12 draws in on the flexible member 13 to tilt the upright frame 11, the cable will move sufficiently to draw the member 20 downwardly into engagement with the upper end of the load, whereby a sufficient gripping force will be obtained between the projecting portion 18 and the top clamping member 20 to secure the load on the load carrying member 14, before any tilting or elevating movement of the upright member 11 takes place. A further drawing in movement of the cable will then tilt the frame and load supporting member inwardly over the truck. The telescopic members 16 serve to resiliently oppose this tilting movement a sufficient amount to always maintain a considerable tension in the cable, hence the gripping member is forcefully maintained in engagement with the load during the load elevating, tilting and lowering movements.

If it is desired to rotate the load from this inclined position, that is, the transportable position when the member 11 is tilted, to the dot and dash line shown, to a substantially horizontally position and then deposit it, the frame 11 may be retained in the tilted position by a suitable latch mechanism (not shown) and as the cable stretch is gradually released by the winding mechanism the load and load supporting member will be swung downwardly to a horizontal position. The center of gravity of the load and frame 11 may be so disposed with relation to the rotating axis of the load supporting member 14, as to effect this swinging movement by gravity. The relation of the various parts whereby they are adapted to obtain this result is described in the Cochran application hereinbefore referred to.

In the present instance, due to the decrease in the circumferential span of the load receiving or supporting member 14, it is desirable that an extension be provided on the member 14 to support the load along the sides when being swung or lowered into a horizontal position or when the load is to be received while in a reclining position. This means may comprise an arcuate extension on the load supporting member 14 which may be shifted in a circumferential direction about the side of the load a sufficient distance to pass the center of gravity thereof.

A very simple and economical supporting mechanism which may be manipulated from the driver's position on the truck, may comprise arcuate members 34, maintained in sliding engagement with the load supporting member 14 by properly formed straps 35 and 36 rigidly secured to the load supporting member. The position of these members may be substantially halfway between the bottom projection 18 of the load supporting member and the gripping member 20 and may also be such that they may be manipulated by the operator from his position on the truck by means of a flexible member 37. The flexible member 37 may have sufficient slackness to permit the retention of a looped portion thereof by a sheave member 38 positioned at the front of the truck. When the load supporting member 14 is being rotated about its pivotal bearing axis 15, sheave members 39 and 40 mounted thereon, may serve as a guide means for this flexible member. The ends of the flexible member may be attached to connection plates 41 and 42 secured to the ends of the arcuate load supporting members 34. Thus the operator may slide the members 34 to the extended position illustrated in Figs. 1 and 6 prior to the raising or the lowering of the load from or to a horizontal position or if it is desired to approach a roll standing in vertical juxtaposition to another roll the operator may slide the member 34 in an arcuate direction about the load supporting member 14 to an inward or retracted clearing position, substantially as shown in Fig. 5.

It will be seen that the extension arm 34 affords a very convenient means for receiving the load upon the trunk when the load supporting member 14 is swung to a horizontal position and the upright frame 11 is permitted to swing upwardly to a substantially vertical position. The members 34 in this instance would be extended and would thus be lowered to contact with the ground or floor. The ends 44 thereof may be rounded whereby the load may be rolled over these ends when a horizontal load is received. When a horizontally disposed load is deposited on the member 14 the winding mechanism functions in the manner hereinbefore described in causing the cable to first act on the gripping member 20 to bring it into engagement with an end surface of the roll. The roll is then gripped between the member 20 and the end portion 18 of the load supporting member before any elevating or swinging movement is imparted to the upright member 11 or the load supporting member 14 respectively and is continuously clamped in position whether it is being swung upwardly from a horizontal position to an inclined position by movement of the load supporting member or is being tilted inwardly to a transportable position on the truck by movement of the upright member 11.

From the foregoing description of a specific embodiment of my invention, it would seem that extremely heavy loads may be loaded and secured automatically in a transportable position on a truck regardless of the disposition of the load relative to other or similar articles to be handled. The load may be taken up from either a vertical or horizontal position, elevated to an inclined transportable position on the truck and subsequently may be deposited in either of those positions without necessitating any manual effort on the part of the truck operator, other than the manipulation of the flexible member 37 and the usual levers which control the movement of the truck and the operation of the winding mechanism.

It will also be apparent that my invention, while being herein described as specifically applied to a truck constructed for the particular purpose of handling large paper rolls, is adaptable to a variety of forms which may be conveniently applied to other types of industrial trucks, such as elevating platform trucks, tier lift trucks, etc.

I claim:

1. The combination in a truck of an upright frame mounted thereon, a load lifting member operatively mounted on the frame, means to raise said load lifting member and mechanism carried by the load lifting member and vertically movable relative thereto for automatically engaging the top surface of the load to clamp the top and bottom surfaces thereof when said load lifting member is raised.

2. The combination in a truck, of a load lifting member mounted on the truck, means mounted on the truck for lifting the load and vertically movable means carried by the load lifting member for securing the load on the load lifting member and a power operated means for actuating said load securing and said load lifting means in sequence.

3. The combination with a truck, of means for elevating a load, a vertically movable member for securing the load in position on said first named means and a single power operated means for operating said load securing member and said load lifting means.

4. The combination in a truck, of a load supporting frame mounted thereon, a load lifting means operatively mounted on the frame, means to raise said load lifting means and a vertically movable member carried by the load lifting means and operable prior thereto for automatically engaging the load when said load lifting means is raised.

5. The combination of a truck, a support thereon, a load lifting means movable on the support, vertically movable load clamping means carried on the latter means for clamping the opposite ends of a load to be transported and a single power operated means for causing said last named means to engage the load when the load is positioned on the load lifting means and to thereafter cause the load lifting means to be actuated.

6. The combination of a truck, an upright frame mounted thereon, a load lifting member mounted on the upright frame and swingably movable relative thereto, said load lifting member having a bottom load engaging portion rigid therewith and adapted to engage the bottom of a load and an upper relatively movable load engaging member adapted to clamp the load on the load lifting member when said load engaging member is operated.

7. The combination with a truck, of an upright frame mounted thereon, means swingably mounted on the upright frame for engaging the top and bottom of a load, said means including a clamping mechanism, a power operated actuating mechanism therefor and a load lifting member actuated by the power operated mechanism, consequent to a load engaging movement of the load clamping mechanism.

8. The combination of a truck frame, a load lifting means mounted on the truck frame and movable relative thereto, said load lifting means having a bottom load engaging member rigid therewith and an upper, vertically movable load engaging member adapted to clamp the load on the load lifting means.

9. The combination with a truck, of an upright frame mounted thereon, means carried by the upright frame and operatively movable relatively thereto for engaging a load, said means including a clamping mechanism movable in one direction, a power operated actuating mechanism therefor and a load lifting member actuated by the power operated mechanism in an opposite direction consequent to a load engaging movement of the load clamping mechanism.

10. The combination of a truck, a load lifting mechanism swingably mounted on the truck frame, said load lifting member having a bottom load engaging portion rigid therewith and an upper oppositely movable load engaging member adapted to clamp the load to the bottom of the load lifting member when said load is lifted.

11. The combination with a truck of a load supporting means mounted thereon, means carried by the load supporting means and operatively movable relatively thereto for engaging a load, said means including a vertically movable clamping mechanism, a power operated actuating mechanism therefor, and a load lifting member actuated by the power operated mechanism, consequent to a load engaging movement of the load clamping mechanism.

12. The combination of a truck, an upright frame pivotally secured thereto, a load tilting means supported by the upright frame and adapted to shift the load from a vertical to an inclined position, means carried by the latter means for engaging the top and bottom surfaces of a load to be transported and means for causing said last named means to engage the load and thereafter tilt the upright frame and load.

13. The combination in a truck of an upright frame pivotally mounted thereon, a load lifting member mounted on the upright frame and adapted to swing in one position to approximate the vertical, means to tilt the upright frame and said load lifting member, and means carried by the load lifting member and operable by the said first mentioned means for automatically engaging the load when said last named means tilts the upright frame.

14. The combination of a truck, an upright frame pivotally secured thereto, means to shift the upright frame, a load lifting member pivoted to the upright frame, said load lifting member having a bottom load engaging portion rigid therewith and an upper movable load engaging member adapted to clamp the load on the load lifting member when said upright frame shifting means is operated.

15. The combination of a truck, an upright frame pivotally connected therewith, means movable with said upright frame for engaging the top, bottom and side of a load, and means for tilting the upright frame and causing said last named means to engage the load prior to imparting a tilting movement to the upright frame.

16. The combination in a truck adapted to carry a roll of paper of an upright frame secured thereto and adapted to swing from a substantially vertical to an inclined position, load-lifting means carried by the upright frame for engaging the bottom of the load, and means for tilting the upright frame, said load-lifting means having a rigid member adapted to engage the bottom of the load and a member actuated when the load-lifting member is operated and adapted to engage the top of the load when said upright frame tilting means is operated.

17. The combination of a truck, an upright frame pivotally secured thereto, load lifting means supported by the upright frame adapted to shift the load from a horizontal to an inclined position, means carried by the latter means for engaging the ends of the load and means for causing said last named means to engage the load and thereafter raise the load.

18. The combination in a truck of an upright frame pivotally mounted thereon, a load lifting member secured to the upright frame and adapted to swing in one position to approximate the horizontal, means to swing the upright frame and to rotate said load lifting member, and means carried by the load lifting member and operated when the means to swing the upright frame is actuated for automatically engaging the load prior to any swinging movement of the upright frame.

19. The combination of a truck, an upright frame pivotally secured thereto, lifting means rotatably mounted on the upright frame, means for securing the load to the load lifting means, and mechanism for successively operating said load securing means and said upright frame respectively.

20. The combination of a truck, an upright frame pivotally secured thereto, means to shift the upright frame, and load handling and lifting means comprised substantially of an arcuate load support rotatably secured to the upright frame and having a projecting portion rigidly secured at the bottom thereof for engaging the bottom of the load, and a relatively movable projecting member positioned at the top of the support adapted to be brought into engagement with the load by said upright frame tilting mechanism prior to the tilting of the upright frame.

21. The combination in a truck adapted to carry a roll of paper, of an upright frame pivotally mounted thereon, load handling and lifting means comprised substantially of an arcuate support rotatably mounted on the upright frame and having a projecting member rigidly secured thereto adapted to be inserted beneath the load, winding mechanism for shifting the upright frame, a movable member positioned at the top of the support and operated by said winding mechanism, and extensible means slidably mounted on the arcuate support for supporting one side of the load when the same is being lowered from a recumbent position to a horizontal position or vice versa.

22. The combination of a truck, an upright frame pivotally secured thereto, load handling and lifting means rotatably mounted on the upright frame and mechanism for successively operating said load handling means and said upright frame including a load engaging member movable longitudinally of the load.

23. The combination of a truck, an upright frame pivotally secured thereto, means to shift the upright frame, load handling and lifting means comprised substantially of a rotatable load support having an arcuate member slidably mounted thereon and controllable from the operator's position on the truck, and a relatively movable member positioned at the top of the support adapted to be brought into engagement with the load by said upright frame tilting mechanism, said arcuate member being adapted to retain the load on the support when the support is being rotated from a horizontal to a vertical position or vice versa.

Signed at Cleveland, Ohio, this 30th day of November, 1923.

ALBERT R. GOLDRICK.